United States Patent
Olcott

[15] 3,694,883
[45] Oct. 3, 1972

[54] METHOD OF MOUNTING A NOZZLE INSERT

[72] Inventor: Eugene L. Olcott, Falls Church, Va.

[73] Assignee: The United States of America as represented by the Secretary of the United States Air Force

[22] Filed: May 20, 1970

[21] Appl. No.: 50,001

[52] U.S. Cl. ............ 29/157 C, 60/200 A, 239/265.11
[51] Int. Cl. ............................................. B21d 53/00
[58] Field of Search .................. 29/157 C; 60/200 A; 239/265.11

[56] References Cited

UNITED STATES PATENTS

| | | | |
|---|---|---|---|
| 3,048,972 | 8/1962 | Barlow | 239/265.15 |
| 3,142,960 | 8/1964 | Bluck | 138/44 |
| 3,261,558 | 7/1966 | Davies | 239/265.11 |
| 3,292,376 | 12/1966 | Ernst et al. | 60/253 |

Primary Examiner—Samuel Feinberg
Attorney—Harry A. Herbert, Jr. and Arsen Tashjian

[57] ABSTRACT

A method of mounting in a composite-type rocket nozzle, a nozzle insert which is substantially annular in configuration and which has four surfaces, three of which are external and uncoated, and the fourth of which is internal and is coated with pyrolytic graphite. The method includes the steps of coating the insert on the three uncoated external surfaces with a thin layer of silicone grease, coating two of the external surfaces with a layer of a filled epoxy cement on the thin layer of silicone grease, coating the third external surface with a layer of silicone rubber on the thin layer of silicone grease, and placing the insert in its proper position in the composite-type rocket nozzle. This method of mounting promotes the service life of the insert by eliminating the application of tensile stresses to the insert.

1 Claim, 1 Drawing Figure

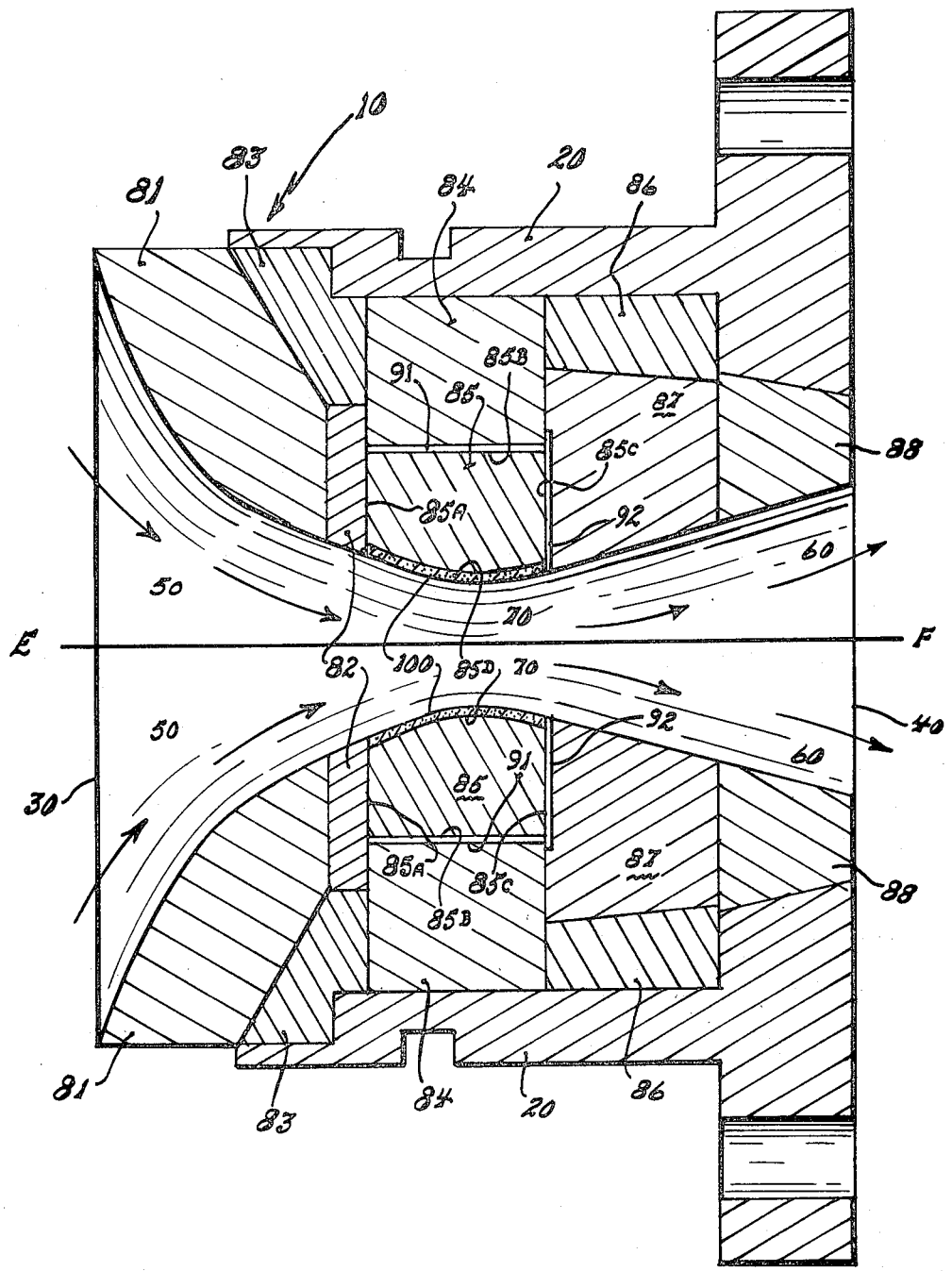

METHOD OF MOUNTING A NOZZLE INSERT

BACKGROUND OF THE INVENTION

This invention relates to rocket motor nozzles and, more particularly, to a method of mounting a rocket motor nozzle insert.

One form of a conventional rocket motor nozzle is internally structured as a composite. That is, the internal portion of the nozzle is composed of a number of different inserts which collectively constitute, form and define the flow path within the nozzle. Because of the high temperature and the highly erosive nature of the gases which are generated by rocket motors and which flow through the nozzle, the nozzle inserts are made of materials which have very high resistance to high temperature and erosion. One such material is graphite and, accordingly, a type of conventional insert is made of graphite, usually with a pyrolytic graphite coating at the gas flow interface surface. Additionally, the conventional insert is configurated in a generally annular shape, with its central axis coincident with the longitudinal axis of the nozzle.

During the flow of the hot erosive gases, the surfaces of the inserts exposed to the gases undergo a far more rapid expansion than the unexposed surfaces, with the result that stresses are created which cause cracking of the inserts and delamination of the pyrolytic graphite coating. The problem is further compounded by the fact that it is customary in the art to bond each insert to adjacent inserts or parts, thereby restraining the bonded and unexposed surfaces from expanding.

It is obvious, therefore, that there currently exists a critical need for a method of mounting nozzle inserts to provide service life by preventing the above-described cracking and delamination.

I have invented such a method.

SUMMARY OF THE INVENTION

This invention pertains to a pyrolytic graphite coated rocket motor nozzle insert and, more specifically, to a method of mounting such an insert in a composite-type rocket nozzle.

An object of this invention is to prevent cracking or the like of the insert during rocket motor firing.

Another and related object of this invention is to prevent delamination of the pyrolytic graphite coating at the gas flow interface surface of the insert.

Still another and more general object is to promote the service life of the insert.

These objects and still other and related ones of this invention will become readily apparent after a consideration of the description of the invention and reference to the drawing.

DESCRIPTION OF THE DRAWING

The drawing is a side elevation view in cross-section and in schematic form, of a conventional composite-type rocket motor nozzle assembly which embodies the invention.

DESCRIPTION OF THE PREFERRED EMBODIMENT

In the drawing is depicted a typical composite-type rocket nozzle assembly 10 which includes: external steel casing 20; entrance 30; exit 40; and nozzle inserts 81–88, inclusive, which define convergent section 50, divergent section 60 and, located therebetween, throat area 70.

Also shown are nozzle assembly longitudinal axis E–F and, as indicated by arrows, the direction of gaseous flow from entrance 30 to and through exit 40.

With reference to nozzle insert 85, which insert will be used to describe the practice of my inventive method, said insert has four surfaces, i.e., entrance and external radial surface 85A, external longitudinal surface 85B, exit end external radial surface 85C, and internal longitudinal surface 85D which is coated with pyrolytic graphite 100. Insert 85, as well as the other inserts, is of an annular configuration with its central axis coincident with longitudinal axis E–F of nozzle assembly 10. It is to be noted that insert 85 is bounded on two surfaces 85B and 85C by gaps 91 and 92 which are approximately 7 mils wide or thick.

DESCRIPTION OF THE METHOD

In essence, my method of mounting a pyrolytic graphite coated rocket nozzle insert in a composite-type rocket nozzle, to promote the service life of the insert, is based upon the phenomenon that if the nozzle insert can be provided with freedom and yet have firm support when in its proper position in the composite-type rocket nozzle, the application of tensile stresses to the insert is entirely eliminated or, at the very least, is minimized to the extent that no cracking or the like and no delamination of the pyrolytic graphite coating, such as 100, occurs.

Accordingly, at the appropriate time during the build-up of the nozzle, I coat the insert to be mounted by and protected by my method, such as 85 in this instance, on the external surfaces (i.e., the entrance end external radial surface 85A, the external longitudinal surface 85B, and the exit end external radial surface 85C) with a thin layer of silicone grease. I then coat two of the external surfaces (i.e., the entrance end external radial surface 85A and the external longitudinal surface 85B) with a layer of a filled epoxy cement on top of the thin layer of silicone grease. Then, I coat the third external surface (i.e., the exit end external radial surface 85C) with a layer of silicone rubber on top of the thin layer of silicone grease. Thereafter, I place insert 85 in its proper position in the composite-type rocket nozzle.

I find that this method of mounting a nozzle insert provides the insert with the necessary freedom, and the equally necessary firm support, to eliminate the application of tensile stresses to the insert.

Although reference has been made to the use of the invention in the rocket motor nozzle art, this is but one specific application of my inventive method. For example, the method obviously may be used in mounting components in a conduit for high temperature gases.

Additionally, although an insert of a particular geometric configuration i.e., insert 85, was referred to as the insert mounted by the use of my method, it is to be understood that this is by way of illustration only and not by way of any limitation.

Further, although my method has been described in preferred sequential steps, it is also to be understood that in certain instances changes in sequence of the steps may be made by those of ordinary skill in the art and the same result be achieved. For example, the step of placing the insert may be varied in sequence to best suit the particular circumstances. With reference to the drawing, it may be advantageous to place the insert, such as 85, after having coated the three external surfaces 85A, 85B, and 85C with silicone grease, and after having coated entrance end external radial surface 85A with a filled epoxy cement. Thereafter, gap 91 can be filled with filled epoxy cement and gap 92 can be filled with silicone rubber.

What I claim is:

1. The method of mounting, in a composite-type rocket nozzle, a nozzle insert which is substantially annular in configuration and which has four surfaces, three of which uncoated and are external, which include an entrance end external radial surface, an external longitudinal surface, and an exit end external radial surface, and the fourth surface of which is an internal longitudinal surface which is coated with pyrolytic graphite, comprising the steps of:

a. coating the insert on the entrance end external radial surface, the external longitudinal surface, and the exit end external radial surface with a thin layer of silicone grease. grease;

b. coating the entrance end external radial surface of the insert, and the external longitudinal surface of the insert, with a layer of filled epoxy cement on said thin layer of silicone grease already thereupon;

c. coating the exit end external radial surface with a layer of silicone rubber on said thin layer of silicone grease already thereupon;

d. and, placing the insert in its proper position in the composite-type rocket nozzle;

whereby the insert is provided with freedom, and yet is firmly supported, and thereby the application of tensile stresses to the insert is eliminated.

* * * * *